(12) United States Patent  
Weiner et al.

(10) Patent No.: US 9,524,107 B2  
(45) Date of Patent: Dec. 20, 2016

(54) HOST-BASED DEVICE DRIVERS FOR ENHANCING OPERATIONS IN REDUNDANT ARRAY OF INDEPENDENT DISKS SYSTEMS

(71) Applicant: Avago Technologies General IP (Singapore) Pte. Ltd, Singapore OT (SG)

(72) Inventors: Adam Weiner, Milpitas, CA (US); James A Rizzo, Austin, TX (US); Mark Ish, Norcross, GA (US); Robert L Sheffield, Boulder, CO (US); Horia Cristian Simionescu, Milpitas, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 342 days.

(21) Appl. No.: 14/447,389

(22) Filed: Jul. 30, 2014

(65) Prior Publication Data

US 2016/0034186 A1 Feb. 4, 2016

(51) Int. Cl.
*G06F 13/14* (2006.01)
*G06F 3/06* (2006.01)

(52) U.S. Cl.
CPC ............ *G06F 3/061* (2013.01); *G06F 3/0647* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 5,742,752 A | 4/1998 | Dekoning | |
| 5,950,225 A | 9/1999 | Kleiman | |
| 6,021,462 A | 2/2000 | Minow et al. | |
| 6,151,641 A | 11/2000 | Herbert | |
| 6,513,093 B1 * | 1/2003 | Chen | G06F 3/0617 711/4 |
| 8,321,635 B2 | 11/2012 | Ish | |
| 2010/0070656 A1 * | 3/2010 | Snell | G06F 3/0613 710/5 |
| 2010/0180076 A1 * | 7/2010 | Sundrani | G06F 11/1076 711/114 |

OTHER PUBLICATIONS

U.S. Appl. No. 14/284,276.

* cited by examiner

*Primary Examiner* — Ilwoo Park

(57) ABSTRACT

Methods and structure for host-side device drivers for Redundant Array of Independent Disks (RAID) systems. One system includes a processor and memory of a host, which implement a device driver. The device driver receives an Input/Output (I/O) request from an Operating System (OS) of the host, translates Logical Block Addresses (LBAs) from the received request into physical addresses at multiple storage devices, generates child I/O requests directed to the physical addresses based on the received request, and accesses an address lock system at a RAID controller to determine whether the physical addresses are accessible. If the physical addresses are accessible, the device driver reserves the physical addresses by updating the address lock system, and directs the child I/O requests to a hardware path at the RAID controller for handling single-strip I/O requests. If the physical addresses are not accessible, the device driver delays processing of the child I/O requests.

20 Claims, 9 Drawing Sheets

US 9,524,107 B2

HOST-BASED DEVICE DRIVERS FOR ENHANCING OPERATIONS IN REDUNDANT ARRAY OF INDEPENDENT DISKS SYSTEMS

FIELD OF THE INVENTION

The invention relates generally to storage systems, and more specifically to Redundant Array of Independent Disks (RAID) storage systems.

BACKGROUND

In a RAID environment, a host Operating System (OS) provides Input/Output (I/O) requests to a RAID controller. The I/O requests indicate that data should be written to, or read from, one or more Logical Block Addresses (LBAs) of a logical volume. The RAID controller processes incoming I/O requests to correlate the requested LBAs with physical addresses on one or more storage devices that store data for the volume. The RAID controller can then split an I/O request into individual requests that are each directed to a corresponding storage device in order to retrieve/store the data at the physical addresses.

SUMMARY

Systems and methods herein provide a hostside device driver that is capable of performing RAID tasks in order to reduce the processing workload at a physically distinct RAID controller.

One system includes a processor and a memory of a host, which implement a device driver. The device driver receives an Input/Output (I/O) request from an Operating System (OS) of the host, translates Logical Block Addresses (LBAs) from the received request into physical addresses at multiple storage devices, generates child I/O requests directed to the physical addresses based on the received request, and accesses an address lock system at a RAID controller to determine whether the physical addresses are accessible. If the physical addresses are accessible, the device driver reserves the physical addresses by updating the address lock system, and directs the child I/O requests to a hardware path at the RAID controller for handling single-strip I/O requests. If the physical addresses are not presently accessible, the device driver delays processing of the child I/O requests.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
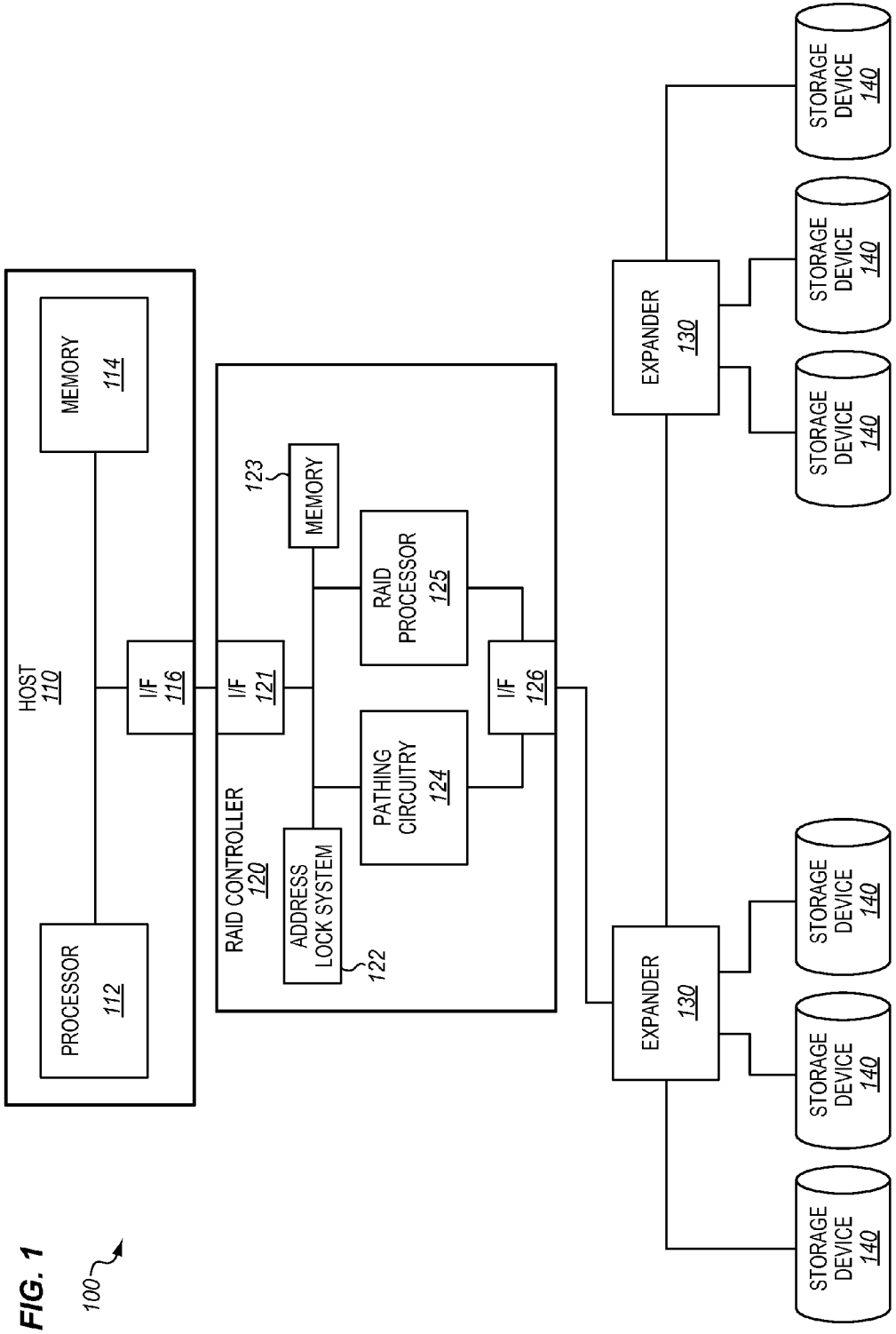
FIG. 1 is a block diagram of an exemplary RAID storage system.

FIG. 1 is a block diagram of an exemplary RAID storage system 100. According to FIG. 1, RAID storage system 100 includes host system 110 and RAID controller 120. In this embodiment, RAID storage system 100 also includes a fabric comprising multiple expanders 130 and storage devices 140. The fabric supports communication channels compliant with protocols for one or more of Peripheral Component Interconnect (PCI), Small Computer System Interface (SCSI), Serial Attached SCSI (SAS), Fibre Channel, Ethernet, Internet SCSI (ISCSI), etc.

An OS of host 110 generates I/O requests that are directed to LBAs of a RAID volume managed by RAID controller 120. These I/O requests can be sent by host 110 to RAID controller 120, which correlates the requested LBAs with physical addresses at one or more storage devices 140. Since RAID volumes stripe data across multiple storage devices in order to enhance redundancy and/or disk access speed, I/O requests received at RAID controller 120 generally cannot be directly translated into a single command for a single storage device 140. Instead, RAID controller 120 engages in a processing intensive technique to generate multiple storage device-specific I/O requests based on each I/O request received from host 110.

A RAID controller can become overloaded when tasked with generating child I/O requests for a large number of host I/O requests. To address this problem, processor 112 and memory 114 implement a device driver for communicating with RAID controller 120. The device driver is capable of splitting I/O requests received from the OS (such as Read-Modify-Write (RMW) requests) into child I/O requests. Each child I/O request is directed to physical addresses on a single storage device, and therefore is directly interpretable without a need for further RAID processing at RAID controller 120 (i.e., the child I/O requests can qualify for LSI Corporation FastPath processing). The child I/O requests can then be applied by the device driver to the storage devices 140, depending on whether address lock system 122 indicates that corresponding stripes of the RAID volume are presently accessible. This enhanced level of device driver processing (also known as a "cut-through path for I/O") reduces I/O congestion at RAID controller 120, enhancing overall throughput within RAID storage system 100.

Host 110 comprises any system capable of performing processing operations upon stored data. In this embodiment, processor 112 and memory 114 (e.g., Random Access Memory (RAM), a Solid State Drive (SSD), hard disk, etc.) of host 110 comprise hardware elements that perform stored instructions in order to operate the OS, and in order to implement the device driver for communicating with RAID controller 120. The OS manages file systems and/or interfaces for performing computing tasks as desired. Specifically, the OS of host 110 generates I/O requests that are directed to the RAID volume, such as requests to retrieve data from or modify data at the RAID volume. The device driver processes the I/O requests from the OS. In further embodiments, the device driver is implemented partially or wholly as custom circuitry. Interface (I/F) 116 (e.g., a Peripheral Component Interconnect (PCI) interface), transfers data (e.g., I/O requests and completions) between host 110 and RAID controller 120 on behalf of the device driver.

RAID controller 120 is physically distinct from host 110 (e.g., is a separable/detachable/independent device coupled with host 110), and comprises any component operable to manage a RAID volume in order to store and/or retrieve data. For example, in one embodiment RAID controller 120 comprises a Host Bus Adapter (HBA) inserted into a motherboard of host 110. RAID controller 120 includes I/F 121, which is compatible with the protocol(s) supported by I/F 116. In one embodiment, I/F 121 and I/F 116 comprise PCI Express (PCIe) interfaces that share a common bus.

Figure 2:
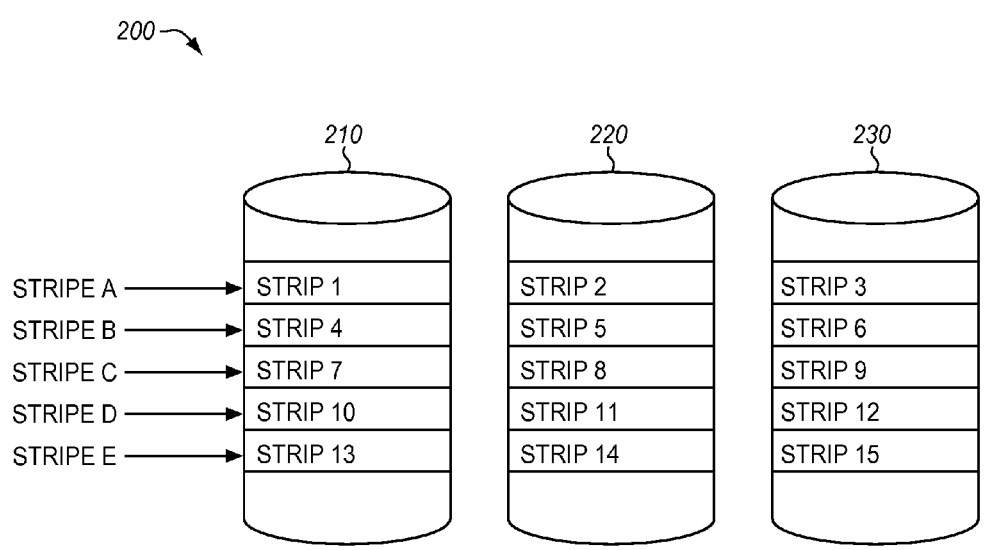
FIG. 2 is a block diagram illustrating exemplary striping in a RAID environment.

According to the embodiment shown in FIG. 1, RAID controller 120 includes pathing circuitry 124, and RAID processor 125. RAID processor 125 manages the processing of multi-strip write requests, while pathing circuitry 124 provides a hardware path dedicated to the processing of single-strip I/O requests. Pathing circuitry 124 can be implemented, for example, as a hardware pathway compliant with LSI Corporation (an Avago Company) standards for Fast-Path processing. Consider block diagram 200 of FIG. 2, which illustrates strip boundaries in a RAID volume stored across three separate storage devices (210, 220, and 230). In this RAID volume, LBAs are "striped" across the storage devices, which increases the speed at which the LBAs can be accessed. A "stripe" represents a set of one or more LBAs written across multiple disks, along with any corresponding parity/redundancy information. Meanwhile, a "strip" is a portion of a stripe that has been written to a single storage device. Thus, only one I/O request is sent to one storage device in order to acquire a strip of data, while multiple I/O requests are sent to multiple storage devices in order to retrieve an entire stripe of data.

Returning to FIG. 1, pathing circuitry 124 is dedicated to handling single-strip I/O requests from host 110 (i.e., I/O requests that are directed to a single strip of data), while RAID processor 125 handles multi-strip I/O requests. Since the processing overhead for handling a multi-strip I/O request is significant, RAID processor 125 can experience delays when under heavy I/O load. Splitting host I/O requests into single-strip child requests at the device driver is beneficial, because it reduces the workload at RAID processor 125.

RAID controller 120 further includes address lock system 122 and memory 123. Address lock system 122 indicates which portions of the RAID volume (e.g., stripes, physical addresses, LBAs) are currently inaccessible. For example, address lock system 122 can exist as a bitmap where each bit indicates whether a given stripe is currently being accessed, as a mutex that uses a single bit/register to represent the availability of each stripe/strip of data, etc. Thus, address lock system 122 can be used to prevent multiple I/O operations from modifying a stripe at the same time. This ensures that modifications to a RAID volume are performed atomically (e.g., to alter entire stripes of volume data), without risking data corruption. Memory 123 comprises any suitable components (an SSD, RAM, NVRAM, etc.) for storing incoming I/O requests at RAID controller 120. For example, in one embodiment memory 123 is divided into "bundles" of memory space that are each allocated to an individual I/O request.

In a further embodiment, RAID controller 120 includes firmware for routing I/O requests to either pathing circuitry 124 or RAID processor 125 (e.g., depending on whether the incoming requests are single-strip requests or multi-strip requests). The firmware can be implemented as circuitry, a processor implementing stored instructions, etc. RAID controller 120 also includes I/F 129. I/F 129 allows RAID controller to generate commands in a protocol supported by the switched fabric and/or storage devices 140. In one embodiment, I/F 129 comprises a SAS physical link (PHY) capable of processing and generating SAS commands for accessing storage devices 140. In another embodiment, I/F 129 comprises a PCI interface.

Storage devices 140 implement storage space for one or more logical volumes. A logical volume can be implemented on any number of storage devices 140 as a matter of design choice. Furthermore, storage devices 140 need not be dedicated to only one logical volume, but can also store data for a number of other logical volumes.

The particular arrangement, number, and configuration of components described herein is exemplary and non-limiting. While in operation, RAID storage system 100 utilizes the device driver of host 110 in order to preemptively split I/O requests (e.g., RMW requests) received from the OS. After the I/O requests have been split into single-strip child I/O requests, they can be processed via pathing circuitry 124 instead of RAID processor 125, thereby saving processing time and resources at RAID processor 125.

Figure 3:
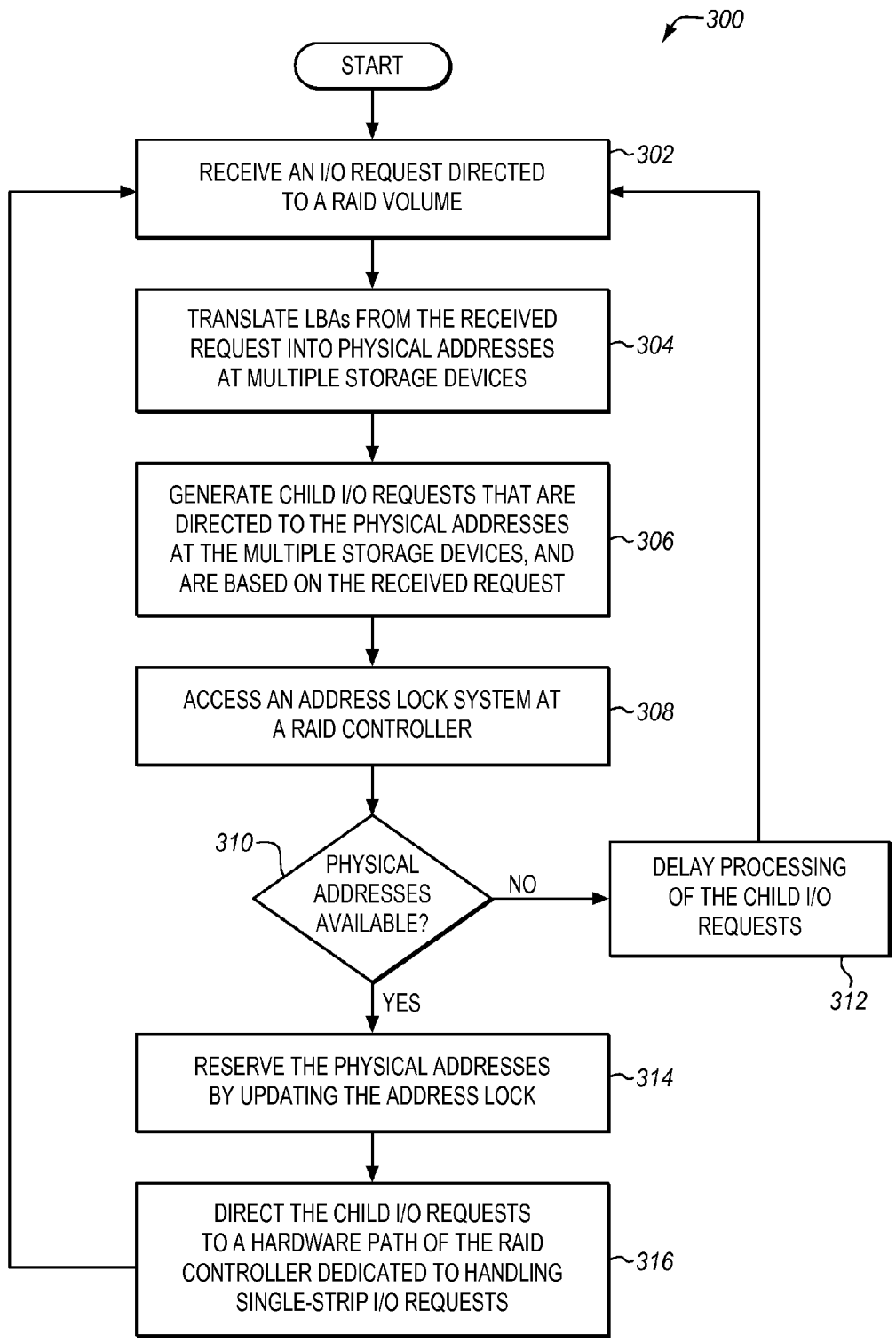
FIG. 3 is a flowchart describing an exemplary method to operate a host-side device driver for a RAID controller.

FIG. 3 is a flowchart 300 describing an exemplary method to operate a host-side device driver for a RAID controller. Assume, for this embodiment, that a RAID volume has been initialized by RAID controller 120 (e.g., as a RAID level 5 or 6 volume), and that host 110 and RAID controller 120 cooperate in order to retrieve and/or alter data for the volume as maintained on multiple storage devices 140. Specifically, the OS of host 110 generates a series of I/O requests directed to LBAs of the RAID volume.

In step 302, the device driver of host 110 receives an I/O request from the OS. In one embodiment, the I/O request from the OS includes a Command Descriptor Block (CDB) as well as a Scatter Gather List (SGL) directed to a logical volume managed by RAID controller 120. The CDB indicates the starting LBA of the request, and the length of the request. Meanwhile, the SGL specifically indicates what addresses are to be read or written. For example, an SGL can include multiple pairs of defined start LBAs and lengths that together define the entirety of the I/O request.

In step 304, the device driver translates the LBAs from the received request into physical addresses at multiple storage devices. This translation allows the device driver to "split" the received I/O request into multiple child I/O requests that are each directed to a single strip of RAID data. In step 306, the device driver generates child I/O requests that are directed to the physical addresses at the corresponding storage devices 140. Each child request corresponds to a single strip of the received host I/O request. Since these child requests have been split at their strip boundaries, they require no further RAID processing, and can be "fast pathed" onward through an expedited hardware pathway of RAID controller 120 (i.e., pathing circuitry 124). The child requests can also include parity data that has been calculated based on the existing stripe data and/or the new stripe data to be written to the RAID volume.

In one embodiment, the device driver further reserves a "bundle" in memory 123 corresponding to the received I/O request, and stores the child I/O requests in the bundle for the received request. These bundles can be pre-allocated by firmware at RAID controller 120, based on an expected size of each received I/O request (and accompanying overhead). In such cases, the device driver maintains an operational index indicating which of the pre-allocated bundles in memory 123 are presently being used for caching data from received I/O requests.

In step 308, the device driver operates I/F 116 to read address lock system 122 and determine whether the physical addresses are available (although in other embodiments, this step can be performed as an initial step, or at any time). For example, in one embodiment the device driver checks to determine whether address lock system 122 indicates that stripes corresponding to the physical addresses are presently inaccessible. If address lock system 122 indicates in step 310 that the physical addresses for the child I/O requests are not available (e.g., their stripes are presently being modified), then the child I/O requests are currently locked out. Thus, processing continues to step 312, where the device driver sends a request via I/F 116 for RAID controller 120 to queue the child I/O requests for later processing. This later processing can be handled by firmware at RAID controller 120. Alternatively, if address lock system 122 indicates in step 310 that the physical addresses used by the child I/O requests are presently available, then processing continues to step 314.

According to step 314, the device driver at host 110 operates I/F 116 to directly manipulate the contents of address lock system 122, altering the value for the relevant physical addresses (and/or their corresponding stripe(s)) in order to reserve them. This prevents other processes (e.g., rebuilds, consistency checks, other I/O requests, etc.) from interfering with the child I/O requests about to be sent to storage device 140.

In step 316, the device driver directs the child I/O requests to a hardware path of the RAID controller 120 that is dedicated to handling single-strip requests. That is, the device driver directs the child I/O requests to pathing circuitry 124 for immediate routing/processing to one or more storage devices 140. Once the requests have been completed, the device driver can further revise address lock system 122 to indicate that the stripes are now available, and can further report successful completion of the received I/O request to the OS. Processing then continues to step 302, where the next I/O request is received from the OS.

Method 300 provides a benefit over prior techniques because it enables a device driver of a host to generate its own FastPath-compatible I/O requests, and further allows a device driver of a host to directly access/manipulate an address lock system kept at a RAID controller, ensuring that the device driver can apply newly created I/O requests atomically to the RAID volume. This enhances overall I/O throughput at RAID storage system 100 while maintaining data integrity.

Even though the steps of method 300 are described with reference to RAID storage system 100 of FIG. 1, method 300 can be performed in other RAID systems and configurations. The steps of the flowcharts described herein are not all inclusive and can include other steps not shown. The steps described herein can also be performed in an alternative order.

In a further embodiment, the device driver determines whether an I/O request received from the host is a Full Stripe Write (FSW) request, or a Read-Modify-Write (RMW) request. The device driver refrains from engaging in method 300 for FSW requests, while engaging in method 300 to enhance the processing speed of RMW requests. This selective processing technique can be beneficial in environments where FSW requests are already processed in accordance with their own enhanced techniques. In a further embodiment, an FSW request is distinguished from an RMW request based on whether or not it is associated with/requests streaming The presence of streaming can be indicated in an I/O flag or similar feature of a given request.

In a further embodiment, the I/O request received from the OS comprises multiple stripes of data. In such cases, the device driver splits the received I/O request into individual stripes, and then generates child I/O requests by splitting the individual stripes at their strip boundaries.

EXAMPLES

In the following examples, additional processes, systems, and methods are described in the context of a RAID storage system.

Figure 4:
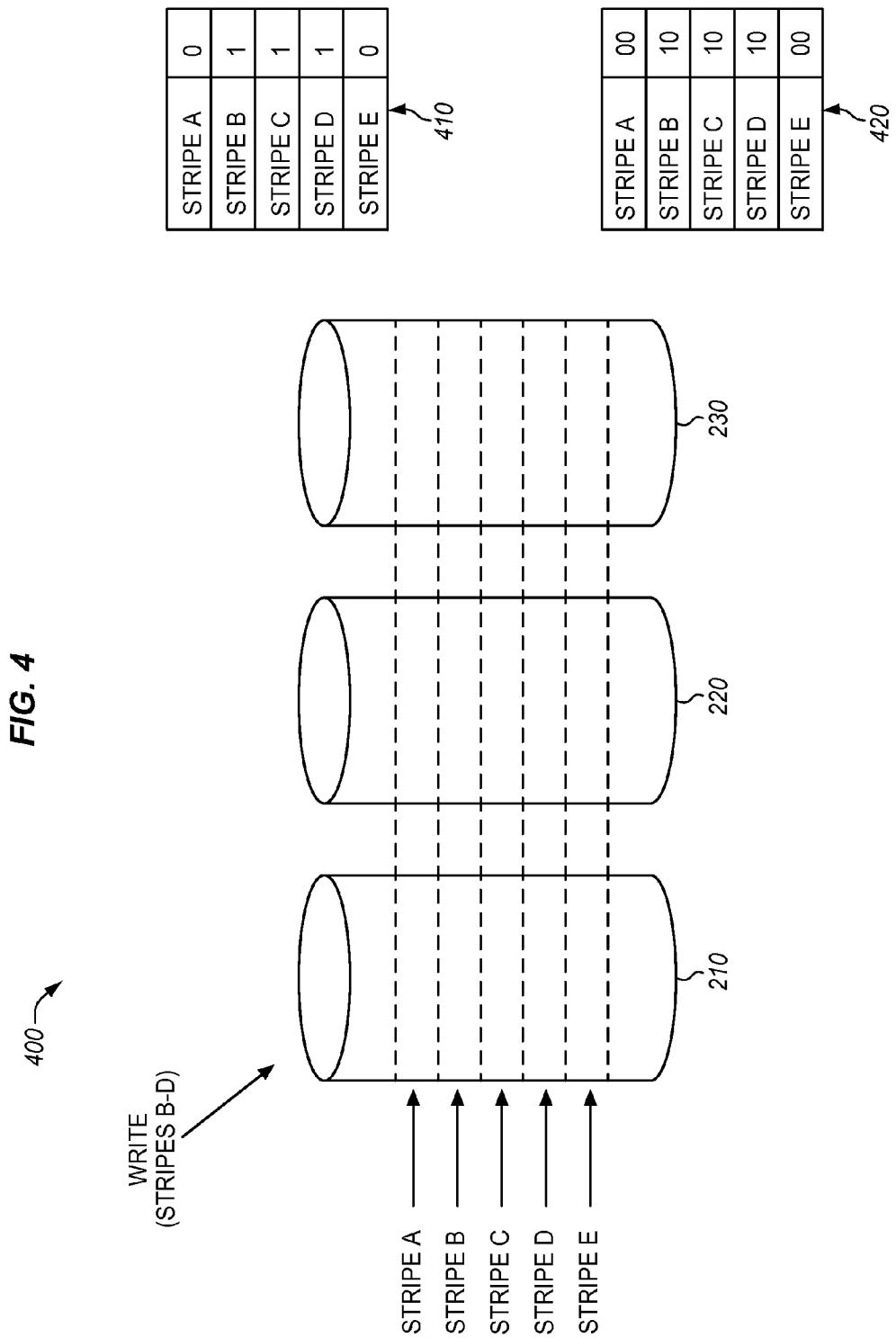
FIG. 4 is a block diagram illustrating exemplary stripe-based mutexes in a RAID environment.

FIG. 4 is a block diagram 400 illustrating exemplary stripe-based mutexes 410 and 420 in a RAID environment. According to this embodiment, mutex 410 includes a bit for each stripe of a RAID volume. When an incoming I/O request (in this case, a write) is received for stripes B-D, the bits for those stripes are set to one, indicating that the stripes are unavailable. Mutex 420 illustrates an alternative version that utilizes two bits per stripe. The first bit indicates whether the stripe is being written to, and the second bit indicates whether the stripe is being read from. In this manner, a stripe that is currently being read from can receive other read requests, but cannot be written to. Meanwhile a stripe that is currently being written to should not be read from or written to until the pending operation has completed. Although mutexes 410 and 420 are shown using availability indicators that vary on a stripe-by-stripe basis, mutexes can use a flag/bit/indicator for individual strips, entire volumes, specific ranges of addresses (i.e., LBAs or physical addresses), etc. For example, in a further embodiment, whenever a write impacts a storage device, the address lock system is updated to lock all LBAs that are even partly stored on that storage device. In the case of an RMW request, this includes sectors/addresses that are read from as well as sectors/addresses that are written to. In this manner, locking a "row LBA" or "stripe LBA" can result in updating the address lock system to restrict access to corresponding storage devices (e.g., parity disks). In this manner a subsequent write, directed to a restricted/reserved stripe that would affect the same parity sectors of the volume that are currently being altered, will encounter a collision at the address lock system and therefore be prevented.

In a further embodiment, the address lock system can include 512$k$ hash slots, where each hash slot corresponds to a hashed value of an LBA. This reduces the overall size of information to be tracked at the address lock system, which increases performance For example, the availability of each hashed LBA can be represented as a single bit that includes hardware support. In this manner, an atomic test-and-set can be used to either set a bit and return a good status for a given hashed LBA, or to fail to set the bit (e.g., because the bit is already reserved), thereby causing a bad status to be returned and preventing reservation of the hashed LBA.

Figure 5:
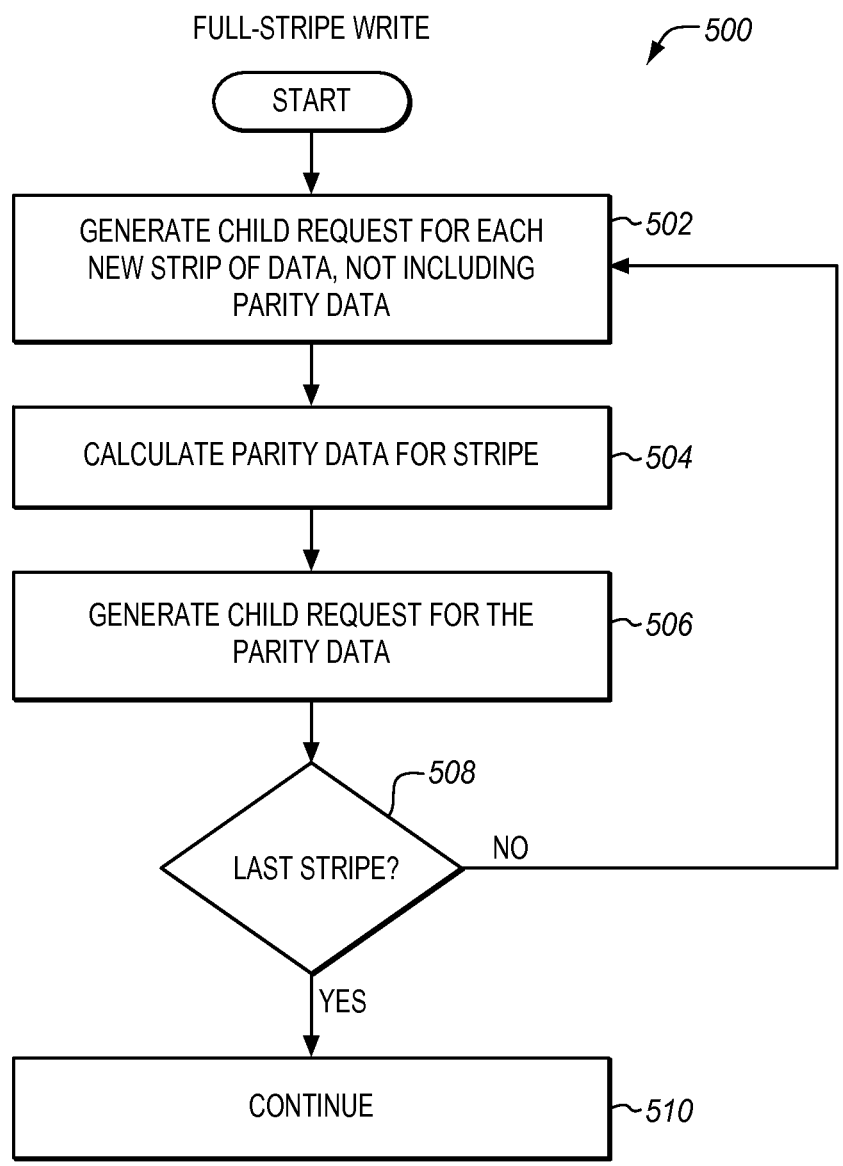
FIGS. 5-6 are block diagrams exemplary methods for handling full stripe write requests and read-modify-write requests.
Figure 6:
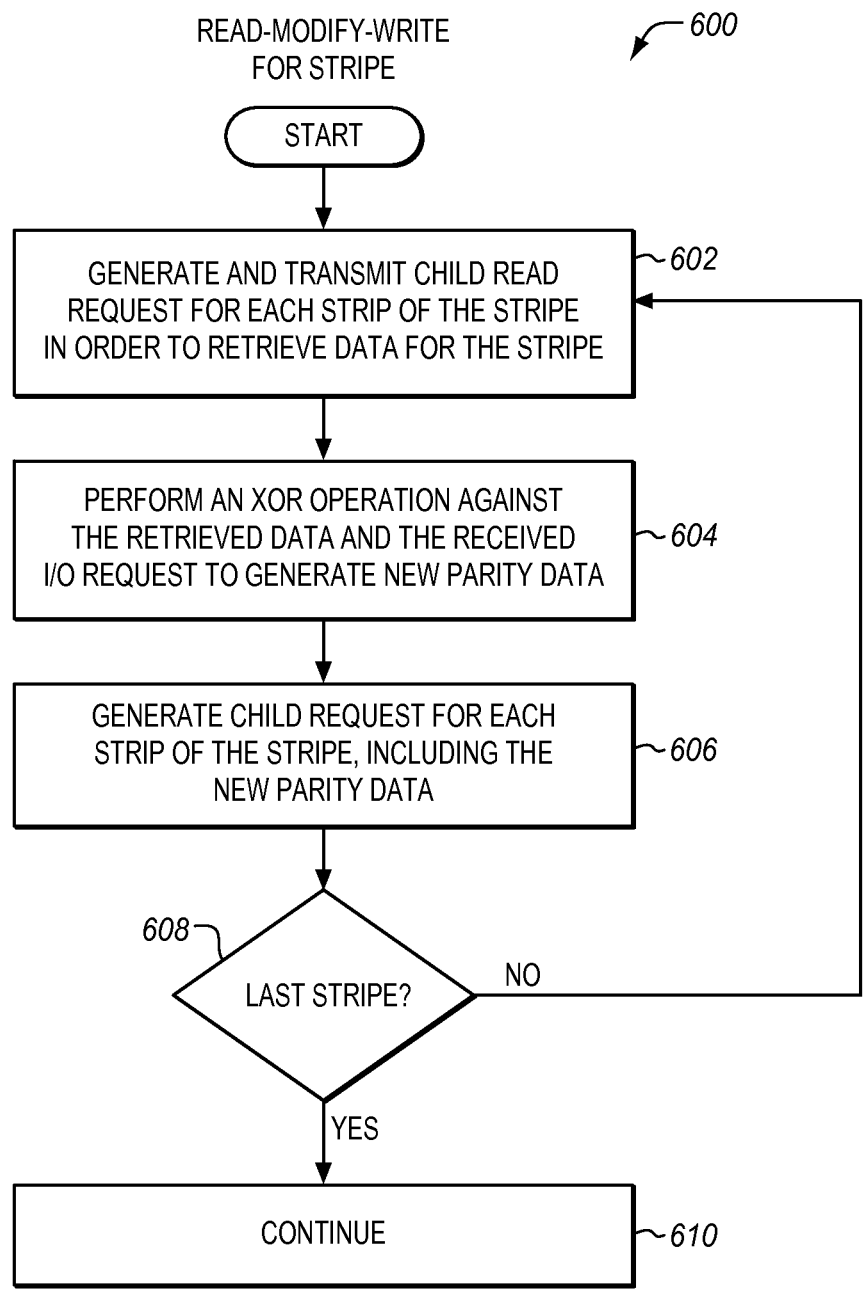

FIGS. 5-6 are block diagrams exemplary methods 500-600 for handling FSW requests and RMW requests. These methods can be performed, for example, before/during steps 304-306 of method 300 of FIG. 3 above, as part of an alternative to method 300, etc. Method 500 describes the processing of FSW requests received from a host OS at the device driver, while method 600 describes the processing of RMW requests at the device driver. In both of these circumstances, parity data for the request is generated at the device driver instead of at the RAID controller. This saves processing resources at the RAID controller, which can be busy performing other tasks such as rebuilding a logical volume, performing a consistency check, reporting I/O completions, etc.

According to method 500, the device driver starts by receiving a new full stripe I/O request in step 502, and generates a child request for each strip of data from the request (not including parity data, which has not yet been calculated). That is, the data found in the newly received I/O request from the OS is split along its strip boundaries into child I/O requests. However, there remains the task of generating parity data for the received I/O request, and populating a child request with that parity data. Since the write request replaces an entire stripe of data, parity data can be generated without referring to the existing stripe data. Thus, in step 504, the device driver utilizes the entire stripe of new data from the received I/O request to calculate parity data (e.g., by performing XOR operations on the stripe of data for the received I/O request). The device driver then continues to step 506 in order to generate a child I/O request for the parity data. If this is the last stripe for the received FSW request in step 508, then processing continues to step 510 and the requests are sent out for processing (e.g., in accordance with method 300). However, if this is not the last stripe from the received I/O request, processing for the next stripe is initiated in step 502.

Method 600 pertains to the processing of RMW requests. According to method 600, the device driver starts processing an RMW request by checking an address lock system at the RAID controller to ensure that the corresponding stripe for the RMW request is available. If the stripe is available, the device driver updates the address lock system to reserve the stripe, and then reserves an "RMW OP" entry. This RMW OP entry is associated with a bundle of memory resources at the RAID controller. In step 602, the device driver generates a child read request for each strip of data from the RMW request. These child read requests are stored in the bundle, and the device driver transmits the child read requests in order to retrieve the existing data for the stripe. Once the child read requests have been completed and the existing data for the stripe has been retrieved (e.g., into the bundle), processing continues to step 604. In step 604, the device driver performs an XOR operation against the retrieved data and the received RMW request in order to generate new XOR parity data for the stripe.

The parity information can be generated by using a host processor or by using hardware accelerator blocks of the RAID controller. The device driver then generates a child write request for each strip of the stripe, including the determined XOR parity data in step 606. The device driver stores these child write requests in the bundle of the RAID controller, and applies the child write requests to the storage devices that hold data for the RAID volume via DMA techniques (e.g., as defined by a DMA frame). The device driver further journals the success or failure of each child write request. New data and parity writes are inserted into a non-volatile memory. A suitable persistent memory can be used, such as non-volatile Double Data Rate (DDR) memory with a battery backup or a flash memory backup. The child writes are then completed and the device driver updates the address lock system to indicate that the stripe is no longer being used. If this is the last stripe of the received RMW request from the OS as indicated in step 608, then processing moves on to step 610, where the device driver waits for another RMW request from the OS. However, if the last stripe of the received RMW request has not yet been processed, then step 602 is initiated by the device driver on the next stripe of the RMW request.

Figure 7:
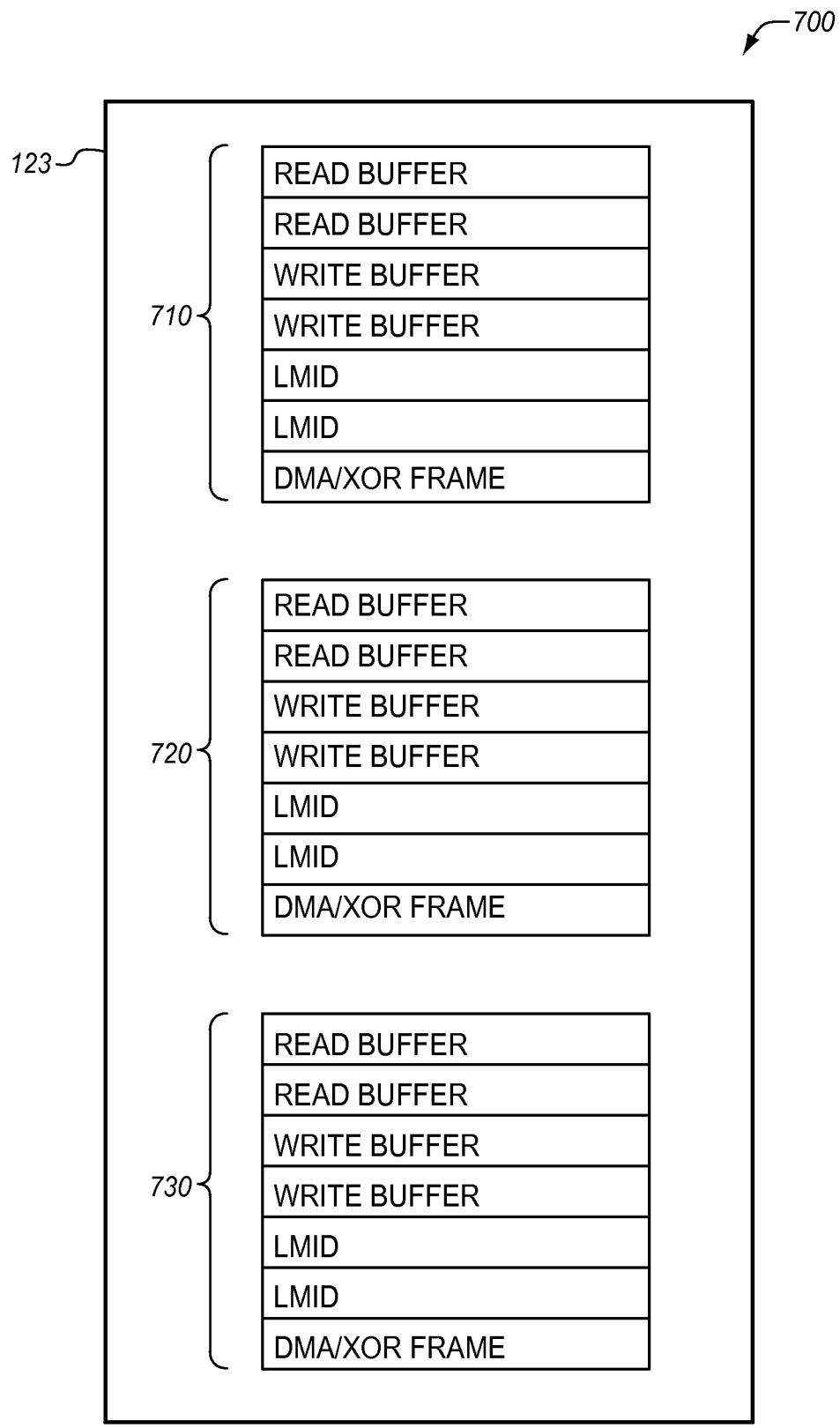
FIG. 7 is a block diagram illustrating exemplary bundles in memory for a RAID controller that can be allocated to individual I/O requests by a device driver of a host.

FIG. 7 is a block diagram 700 illustrating exemplary bundles in memory for a RAID controller that can be allocated to individual I/O requests by a device driver of a host. Specifically, the bundles are allocated in expectation of RMW requests for a RAID 5 volume. According to FIG. 7, the bundles of memory 123 of FIG. 1 have been logically divided so that each provides resources for a single RMW request at RAID controller 120. These bundles at RAID controller 120 are each associated with an RMW OP entry maintained by the device driver. In this embodiment, each bundle (710, 720, 730) includes four buffers (two read, two write) that are each used to store payload data for a single-strip I/O request. Each bundle also includes two Local Message Index Descriptors (LMIDs) that are used as indices to one or more Message Processing Technology (MPT) frames, and a DMA/XOR frame. An MPT frame is an LSI Corporation messaging mechanism used to issue logical or physical I/O requests to a RAID controller. In this context, child I/O requests of a RMW request are each defined in an MPT frame issued to the RAID controller. An LMID is an index into an array of MPT frames, and a DMA frame is used to queue up a request to hardware to move data from the host into the local persistent memory of the RAID controller. An XOR frame is a request that is issued to generate parity information, which can be determined by calculating (OldData XOR NewDATA XOR OldParity) for an RMW operation. As mentioned above, it can be important for volume integrity to ensure that data is in a non-volatile memory before writes are issued for new data and/or parity information.

Figure 8:
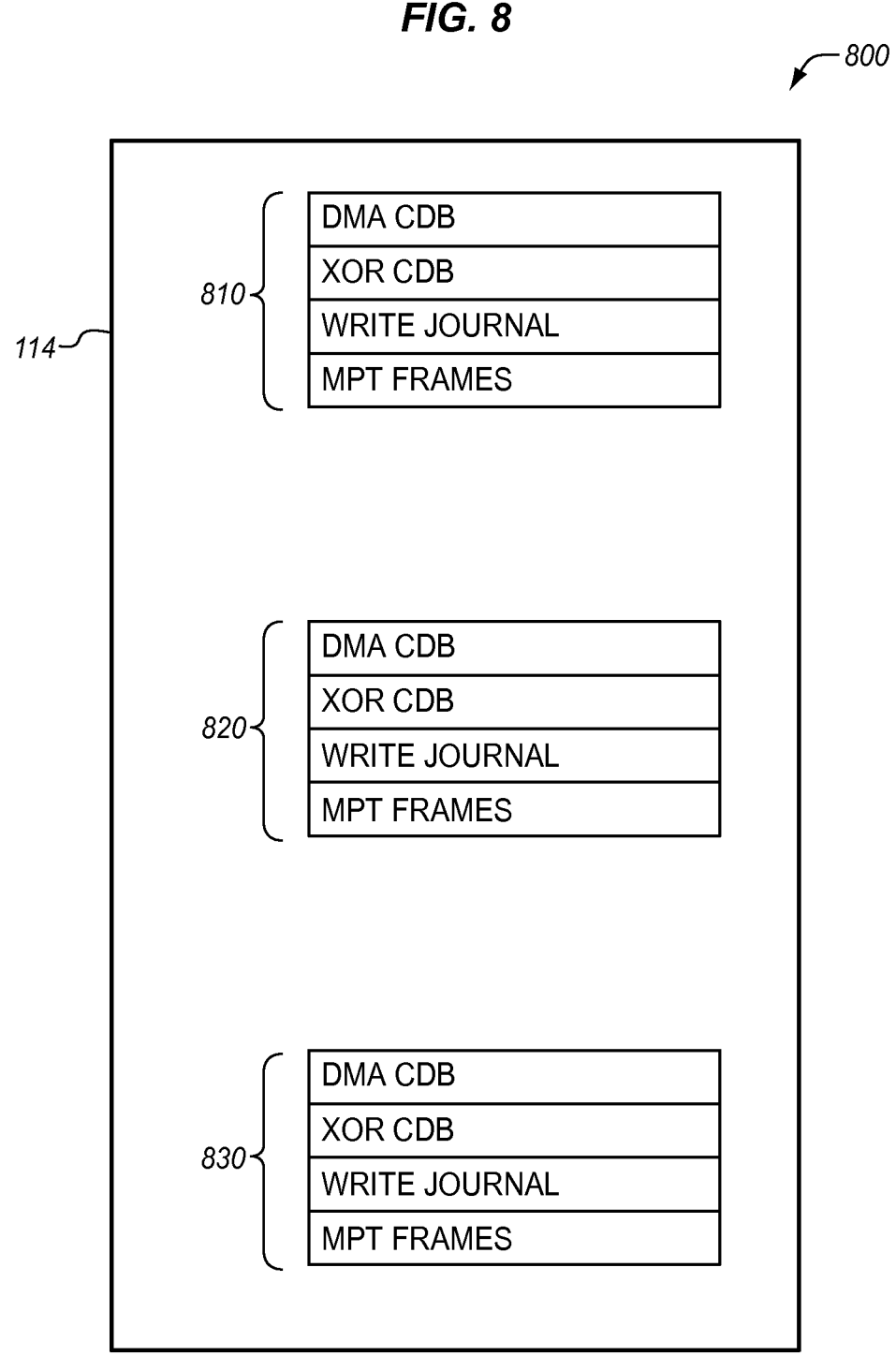
FIG. 8 is a block diagram illustrating an exemplary RMW Operation Index (OP) that refers to bundles in memory for a RAID controller.

FIG. 8 is a block diagram 800 illustrating an exemplary RMW Operation Index (OP) that refers to bundles in memory for a RAID controller. Each RMW OP entry (found in memory 114 of host 110) is associated with a bundle maintained at the RAID controller. In this embodiment, each RMW OP entry (810, 820, 830) includes a DMA CDB used to coordinate DMA actions between RAID controller 120 and a storage device 140, as well as an XOR CDB, a write journal, and multiple Message Processing Technology (MPT) frames. The write journaling helps to protect information in case of power loss. For example, before a write request is issued, the LBA and physical drive ID for a write request for each buffer can be stored. In this manner, writes can be reapplied in the event of a power loss. For example, this can help to avoid what is known as a "R5 write hole." There is also tracking information which determines which parts of an RMW request are currently executing (reads, host DMA/XOR, writes, host I/O completion, resource freeing) and how many operations are currently pending for each part of the RMW request. There can be multiple operations for each part of an RMW request, (that is, two reads, one DMA and one XOR, and two writes), so a counter can be used to determine when all remaining operations for a part of an RMW request have completed.

Figure 9:
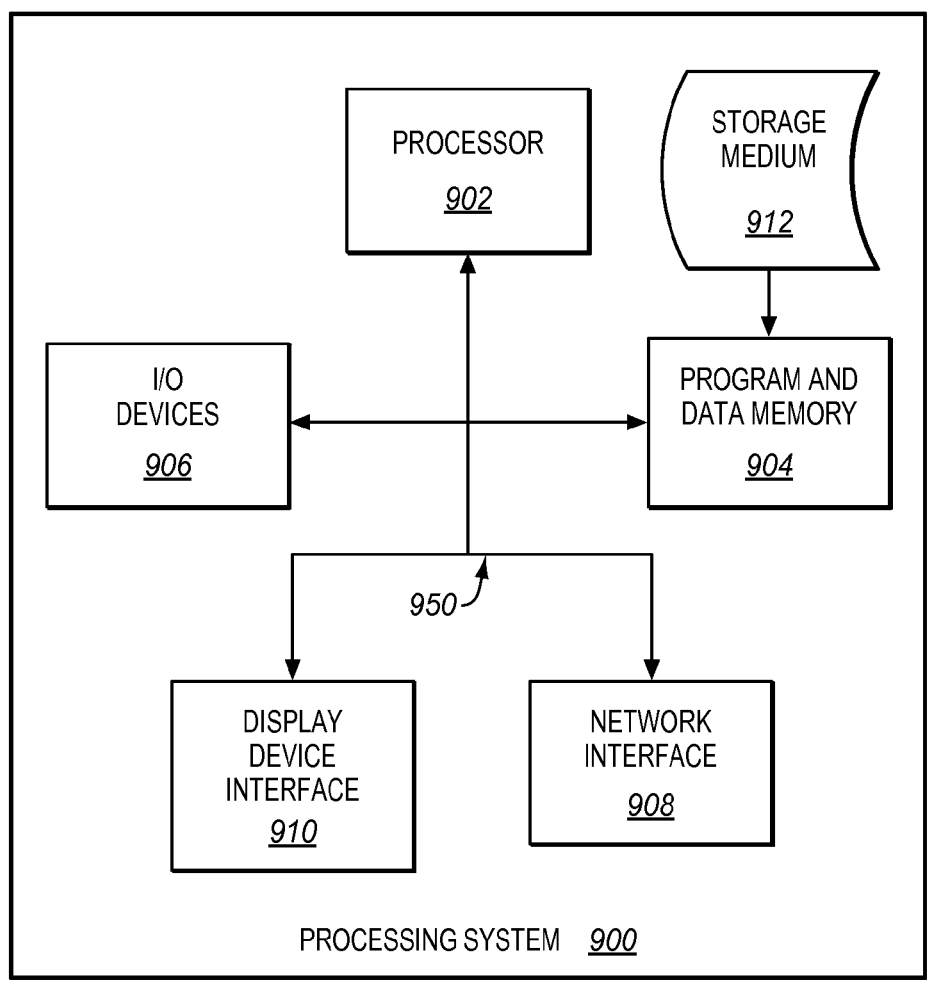
FIG. 9 illustrates an exemplary processing system operable to execute programmed instructions embodied on a computer readable medium.

Embodiments disclosed herein can take the form of software, hardware, firmware, or various combinations thereof In one particular embodiment, software is used to direct a processing system of a host to perform the various operations disclosed herein. FIG. 9 illustrates an exemplary processing system 900 operable to execute a computer readable medium embodying programmed instructions. Processing system 900 is operable to perform the above operations by executing programmed instructions tangibly embodied on computer readable storage medium 912. In this regard, embodiments of the invention can take the form of a computer program accessible via computer readable medium 912 providing program code for use by a computer (e.g., processing system 900) or any other instruction execution system. For the purposes of this description, computer readable storage medium 912 can be anything that can contain or store the program for use by the computer (e.g., processing system 900).

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 can also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 can be integrated with the system to interface to one or more display devices, such as printing systems and screens for presentation of data generated by processor 902.

What is claimed is:

1. A system, comprising:
a processor of a host; and
a memory of the host,
the processor and the memory of the host implement a device driver for communicating with a physically distinct Redundant Array of Independent Disks (RAID) controller,
wherein the device driver is operable to receive an Input/Output (I/O) request, from an Operating System (OS) of the host, that is directed to a RAID volume, to translate Logical Block Addresses (LBAs) from the received request into physical addresses at multiple storage devices, to generate child I/O requests that are directed to the physical addresses at the multiple storage devices and are based on the received request, and to access an address lock system at the RAID controller to determine whether the physical addresses are presently accessible,
wherein the device driver is further operable, responsive to determining that the physical addresses are presently accessible, to reserve the physical addresses by updating the address lock, and to direct the child I/O requests to a hardware path of the RAID controller dedicated to handling single-strip I/O requests, and
wherein the device driver is further operable, responsive to determining that the physical addresses are not presently accessible, to delay processing of the child I/O requests.

2. The system of claim 1, wherein:
the device driver is further operable to generate a child I/O request that includes parity data based on the received I/O request.

3. The system of claim 1, wherein:
the device driver is further operable to selectively generate child requests for received requests, based on whether the received requests are Read-Modify-Write (RMW) requests.

4. The system of claim 1, wherein:
the device driver is further operable to distinguish received Full Stripe Write (F SW) requests from received Read-Modify Write (RMW) requests, and to refrain from generating child I/O requests for the FSW requests.

5. The system of claim 1, wherein:
the device driver is further operable to reserve a portion of memory at the RAID controller for handling the received I/O request,
wherein the portion of memory includes buffers for storing each of the child I/O requests and a Direct Memory Access (DMA) frame.

6. The system of claim 1, wherein:
the device driver is further operable to use Direct Memory Access (DMA) techniques to transfer the child I/O requests from the RAID controller to coupled storage devices.

7. The system of claim 1, wherein:
the device driver is further operable to identify a successful completion message from the RAID controller for each of the child I/O requests, and to report successful completion of the received I/O request to the OS.

8. A method comprising:
receiving, at a device driver of a host for communicating with a physically distinct Redundant Array of Independent Disks (RAID) controller, an Input/Output (I/O) request, from an Operating System (OS) of the host, that is directed to a RAID volume;
translating, at the device driver, Logical Block Addresses (LBAs) from the received request into physical addresses at multiple storage devices;
generating, at the device driver, child I/O requests that are directed to the physical addresses at the multiple storage devices and are based on the received request;
accessing, at the device driver, an address lock system at the RAID controller to determine whether the physical addresses are presently accessible;
if the physical addresses are presently accessible:
reserving the physical addresses by updating the address lock; and
directing the child I/O requests to a hardware path of the RAID controller dedicated to handling single-strip I/O requests; and
if the physical addresses are not presently accessible:

delaying processing of the child I/O requests.

9. The method of claim 8, further comprising:
generating a child I/O request that includes parity data based on the received I/O request.

10. The method of claim 8, further comprising:
selectively generating child requests for received requests, based on whether the received requests are Read-Modify-Write (RMW) requests.

11. The method of claim 8, further comprising:
distinguishing received Full Stripe Write (F SW) requests from received Read-Modify Write (RMW) requests; and
refraining from generating child I/O requests for the FSW requests.

12. The method of claim 8, further comprising:
reserving a portion of memory at the RAID controller for handling the received I/O request,
wherein the portion of memory includes buffers for storing each of the child I/O requests and a Direct Memory Access (DMA) frame.

13. The method of claim 8, further comprising:
utilizing Direct Memory Access (DMA) techniques to transfer the child I/O requests from the RAID controller to coupled storage devices.

14. The method of claim 8, further comprising:
identifying a successful completion message from the RAID controller for each of the child I/O requests; and
reporting successful completion of the received I/O request to the OS.

15. A system, comprising:
a means for processing at a host; and
a means for storing data at the host,
wherein the means for processing and the means for storing data implement a device driver for communicating with a physically distinct Redundant Array of Independent Disks (RAID) controller,
wherein the device driver is operable to receive an Input/Output (I/O) request, from an Operating System (OS) of the host, that is directed to a RAID volume, to translate Logical Block Addresses (LBAs) from the received request into physical addresses at multiple storage devices, to generate child I/O requests that are directed to the physical addresses at the multiple storage devices and are based on the received request, and to access an address lock system at the RAID controller to determine whether the physical addresses are presently accessible,
wherein the device driver is further operable, responsive to determining that the physical addresses are presently accessible, to reserve the physical addresses by updating the address lock, and to direct the child I/O requests to a hardware path of the RAID controller dedicated to handling single-strip I/O requests, and
wherein the device driver is further operable, responsive to determining that the physical addresses are not presently accessible, to delay processing of the child I/O requests.

16. The system of claim 15, wherein:
the device driver is further operable to generate a child I/O request that includes parity data based on the received I/O request.

17. The system of claim 15, wherein:
the device driver is further operable to selectively generate child requests for received requests, based on whether the received requests are Read-Modify-Write (RMW) requests.

18. The system of claim 15, wherein:
the device driver is further operable to distinguish received Full Stripe Write (F SW) requests from received Read-Modify Write (RMW)requests, and to refrain from generating child I/O requests for the FSW requests.

19. The system of claim 15, wherein:
the device driver is further operable to reserve a portion of memory at the RAID controller for handling the received I/O request,
wherein the portion of memory includes buffers for storing each of the child I/O requests and a Direct Memory Access (DMA) frame.

20. The system of claim 15, wherein:
the device driver is further operable to use Direct Memory Access (DMA) techniques to transfer the child I/O requests from the RAID controller to coupled storage devices.

* * * * *